United States Patent [19]

Sasaki et al.

[11] Patent Number: 4,850,006
[45] Date of Patent: Jul. 18, 1989

[54] BOOSTER AND CHARGER UNIT USED FOR HAND-HELD PORTABLE TELEPHONE AND HAVING OVERHEAT PROTECTION CIRCUIT

[75] Inventors: Yutaka Sasaki; Yoshiharu Tamura, both of Tokyo, Japan

[73] Assignee: NEC Corporation, Japan

[21] Appl. No.: 120,826

[22] Filed: Nov. 16, 1987

[30] Foreign Application Priority Data

Nov. 18, 1986 [JP] Japan .................. 61-274300

[51] Int. Cl.$^4$ ............... H04M 11/00; H04M 1/00
[52] U.S. Cl. .................... 379/58; 379/437; 379/451
[58] Field of Search ............... 320/36, 35; 379/437, 379/58, 451, 63; 381/189; 455/127, 343, 117, 217, 89, 346; 330/207 P

[56] References Cited

U.S. PATENT DOCUMENTS

| | | | |
|---|---|---|---|
| 4,027,223 | 5/1977 | Renz | 455/89 |
| 4,234,839 | 11/1978 | King et al. | 320/86 |
| 4,616,171 | 10/1986 | Hernandez et al. | 320/36 |
| 4,634,810 | 1/1987 | Grasel et al. | 455/343 |
| 4,639,550 | 1/1987 | Yamagawa et al. | 379/62 |
| 4,647,722 | 3/1987 | Nishida et al. | 455/89 |
| 4,656,653 | 4/1987 | Oda et al. | 379/58 |
| 4,661,992 | 4/1987 | Garay et al. | 455/346 |
| 4,703,324 | 10/1987 | White | 379/61 |
| 4,737,703 | 4/1988 | Koenck | 320/36 |

Primary Examiner—Jin F. Ng
Assistant Examiner—David H. Kim
Attorney, Agent, or Firm—Laff, Whitesel, Conte & Saret

[57] ABSTRACT

A booster and charger unit for a hand-held portable (HHP) telephone capable of preventing a casing of the unit from being heated to an excessive temperature. The casing has thereinside a charging device for charging a battery, which is installed in the telephone, and a temperature sensor responsive to the temperature of the casing. When the temperature of the casing sensed by the sensor rises to a predetermined level, charging by the charging device is interrupted or the charging current thereof is reduced.

11 Claims, 6 Drawing Sheets

BOOSTER AND CHARGER UNIT USED FOR HAND-HELD PORTABLE TELEPHONE AND HAVING OVERHEAT PROTECTION CIRCUIT

BACKGROUND OF THE INVENTION

The present invention relates to a booster and charger unit for a hand-held portable (HHP) telephone capable of preventing a casing of the booster and charger unit from being heated to excessively high temperatures.

Generally, an HHP telephone is designed with primary importance placed on the convenience of transport and, therefore, miniature, light weight, and small in transmission power. While such a telephone is of course powered by a battery, the battery is usually implemented with an economical and light weight nickel-cadmium battery which is repeatedly usable. On the other hand, the HHP telephone can be used in a car which mounts a car adapter and a booster and charger unit. The car adapter accommodates the HHP telephone and connects the telephone and the unit. The booster and charger unit includes a transmission power booster which serves to boost the transmission power and, thereby, extends the range of communication. The unit also includes a charging circuit adapted to charge a nickel-cadmium battery which has to be charged frequently due to the increase in power consumption which in turn results from the increase in output power as stated above. The transmission power booster generates a substantial amount of heat while in operation, the heat generation reaching a critical degree as a communication is continued over a long period of time. While several hours have heretofore been consumed in charging a chargeable battery, a current trend in the art is toward the use of a rapid charging system which completes charging in one hour or so. A charging circuit with the rapid charging principle, too, generates considerable heat because a large current flows through the circuit within a short period of time. A circuit of the kind generating substantial heat as stated would be damaged due to excessive temperature elevation if not provided with a sufficient countermeasure against heat radiation.

In the case of a booster and charger unit, its casing serves the function of a radiator, and circuits which generate substantial heat as described above are installed in the casing. A prerequisite is, therefore, that the casing of a booster and charger unit be dimensioned large enough to cope with a particular amount of heat generation. However, the booster and charger unit is so designed as to achieve a miniature and light weight configuration as desired to promote the ease of handling and the cut-down of cost, priority being often given to such a configuration over the area available for heat radiation. Today, therefore, the short heat radiation area available with the casing, i.e., the excessive temperature elevation of the casing is the fatal problem with a booster and charger unit for a hand-held portable telephone.

SUMMARY OF THE INVENTION

It is, therefore, an object of the present invention to provide a booster and charger unit for a hand-held (HHP) portable telephone capable of preventing the temperature of a casing from being elevated to an excessive degree.

It is another object of the present invention to provide a generally improved booster and charger unit for a hand-held portable (HHP) telephone.

A booster and charger unit for a hand-held portable (HHP) telephone of the present invention comprises an amplifier for amplifying a transmitting signal, a charger for charging a battery which is stored in the telephone, a casing for accommodating the amplifier and charger, and a temperature sensor for sensing a change in temperature of the casing. The charger reduces its charging current to a predetermined value when a temperature of the casing sensed by the temperature sensor is elevated to a predetermined temperature.

The above and other objects, features and advantages of the present invention will become more apparent from the following detailed description taken with the accompanying drawings.

DESCRIPTION OF THE PREFERRED EMBODIMENT

Figure 1:
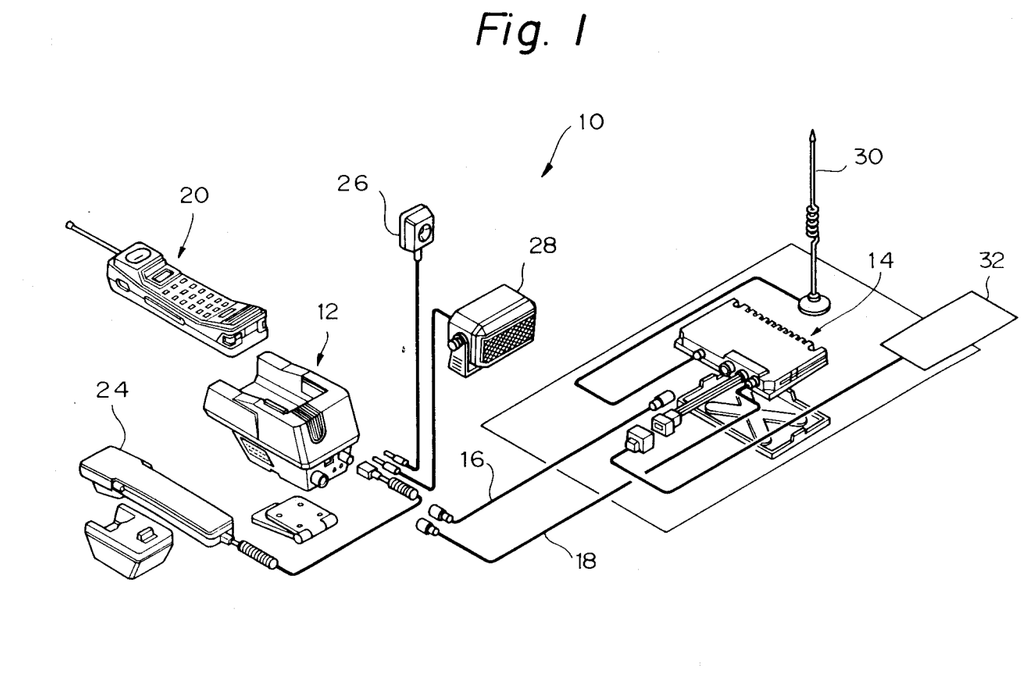
FIG. 1 is a perspective view showing an overall system for allowing a hand-held portable (HHP) telephone to be used in a car-mount configuration.
Figure 2:
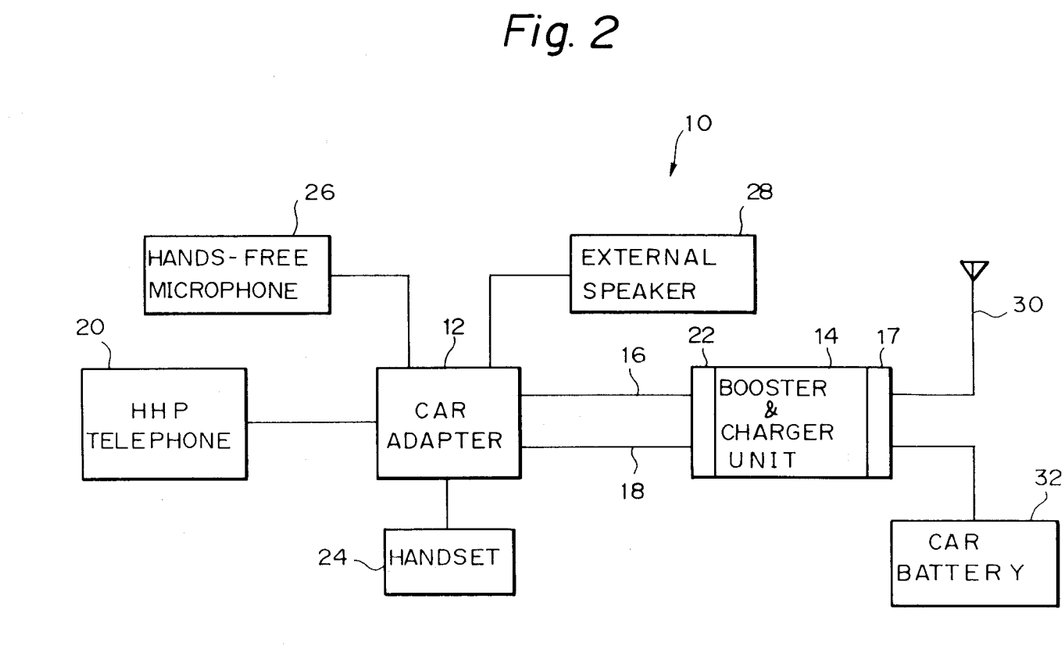
FIG. 2 is a schematic block diagram showing the system of FIG. 1.

To begin with, the overall construction of a system which allows a hand-held portable (HHP) telephone to be used in a car will be described with reference to FIGS. 1 and 2. As shown, in the system 10, a booster and charger unit 14 in accordance with the present invention is mounted in a car and connected to a car adapter 12 by a coaxial cable 16 and a connecting cable 18 and via a connector 22 (FIG. 2). The booster and charger unit 14 is provided with a rapid charging circuit and booster of transmission power. The adapter 12 is connected to a hand-held portable (HHP) telephone 20. Connected to the adapter 12 are a handset 24, a handsfree microphone 26, an external speaker 28, etc. The unit 14 is connected to a car antenna 30 and a car battery 32 via a connector 17 (FIG. 2). While the telephone 20 is not connected to the adapter 12, the booster and charger unit 14 is not operated. On the other hand, while the telephone 20 is connected to the adapter 12, a high-frequency signal for transmission and reception is fed from the telephone 20 to the booster and charger unit 14 via the adapter 12. A speech signal and a control signal are interchanged between the telephone 20 and the booster and charger unit 14 via the adapter 12. Part of the control signal is routed to the unit 14. The charging output of the unit 14 is applied to a battery which is installed in the telephone 20, e.g. a nickel-cadmium battery. When the telephone 20 is connected to the adapter 12 inside of a car, the system 10 functions in the same manner as ordinary in-car radio equipment and, yet, becomes able to charge the battery. Such charge is usually implemented with rapid charge in order to reduce the charging time as far as possible, as will be described later.

Figure 3:
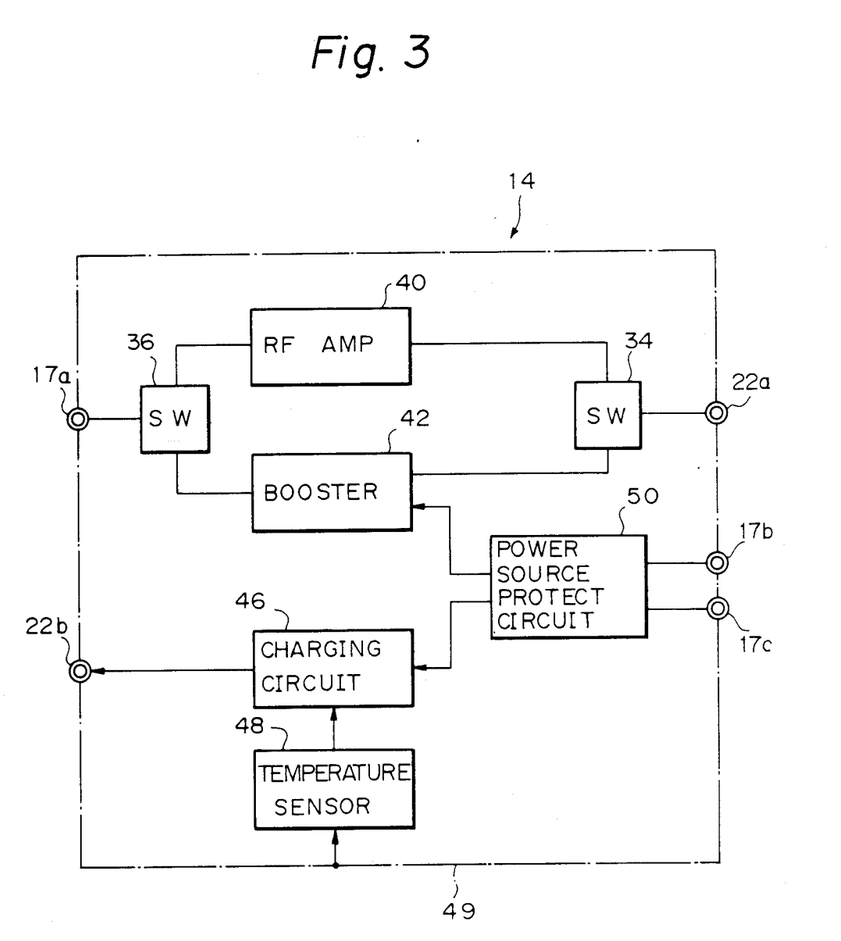
FIG. 3 is a schematic block diagram showing a booster and charger unit which is included in FIG. 2.

Referring to FIG. 3, an electrical arrangement of the booster and charger unit 14 is schematically shown. The unit 14 includes a first switch 34 which is implemented with, for example, a duplexer and connected to a coaxial connector 22a which forms part of the connector 22. The unit 14 further includes a second switch 36 also implemented with a duplexer or the like and connected to a coaxial connector 17a which constitutes part of the connector 17, and a booster 42 for amplifying a transmitting signal and a radio frequency amplifier (RF AMP) 40 for amplifying a received signal, which are connected to the connectors 22a and 17a by the switches 34 and 36. The amplifier 40 and the booster 42 may selectively be connected to the connectors 22a and 17a by switching the switches 34 and 36. Implemented with an amplifier, the RF AMP 40 serves to compensate for the deterioration of sensitivity due to duplexer losses and cable losses. It is to be noted such an amplifier may be omitted and replaced with a simple by-pass. The unit 14 includes a charging circuit 46 having a rapid charging function and connected to a charging current connector 22b which constitutes part of the connector 22, and a temperature sensor 48 for sensing the temperature of a casing 49 of the unit 14 and delivering its output to the charging circuit 46. The temperature sensor 48 may be constituted by a thermistor by way of example. Connected to connectors 17b and 17c, which also constitute part of the connector 17, is a power source protecting circuit 50. This circuit 50 is adapted to apply power to the booster 42 and charging circuit 46 while, when the source polarities are erroneously connected or when an excessive voltage is applied from the outside, protecting the booster 42 and charging circuit 46.

Having the above construction, the booster and charger unit 14 of the present invention suffers from the previously discussed problem, i.e., its casing 49 is heated to sharply elevate the temperature due to the heat which is generated by the various structural elements. In accordance with the present invention, the temperature sensor 48 mounted on the casing 49 senses any change in the temperature of the casing 49, feeding its output to the charging circuit 46. When the casing 49 is heated to a predetermined temperature such as 60° C. as alerted by the output of the temperature sensor 48, the rapid charging function of the charging circuit 46 is interrupted to stop charging. In this condition, it is only the booster 42 that generates heat, even during transmission. This, coupled with the radiating ability of the casing 49 itself, slows down or fully stops the temperature elevation of the casing 49, thereby preventing the inside of the casing 49 from being heated to a level which would damage the various structural elements. When the casing 49 is cooled off to the predetermined temperature, rapid charge is resumed. Thus, the temperature sensor 48 and the charging circuit 46 constitute an overheat protection circuit for the unit 14.

Figure 4A:
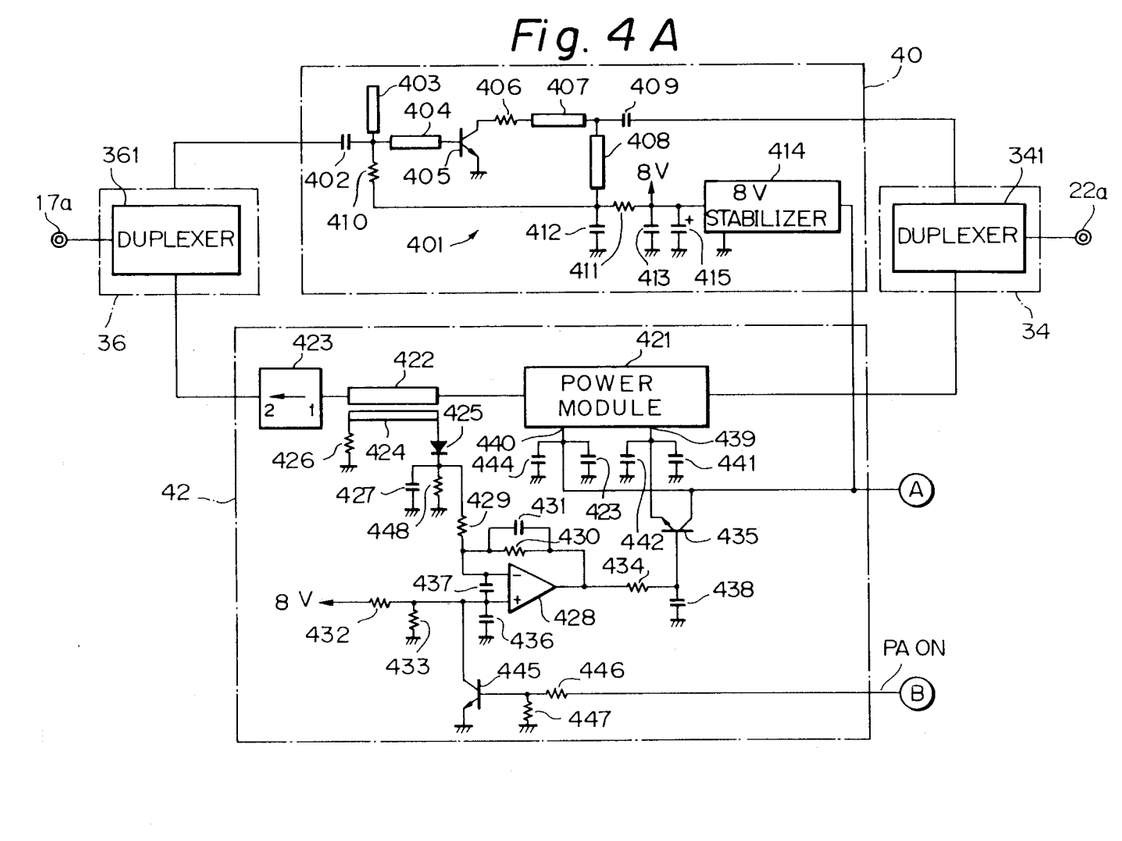
FIGS. 4A and 4B are diagrams showing a specific electrical arrangement of the unit of FIG. 3.
Figure 4B:
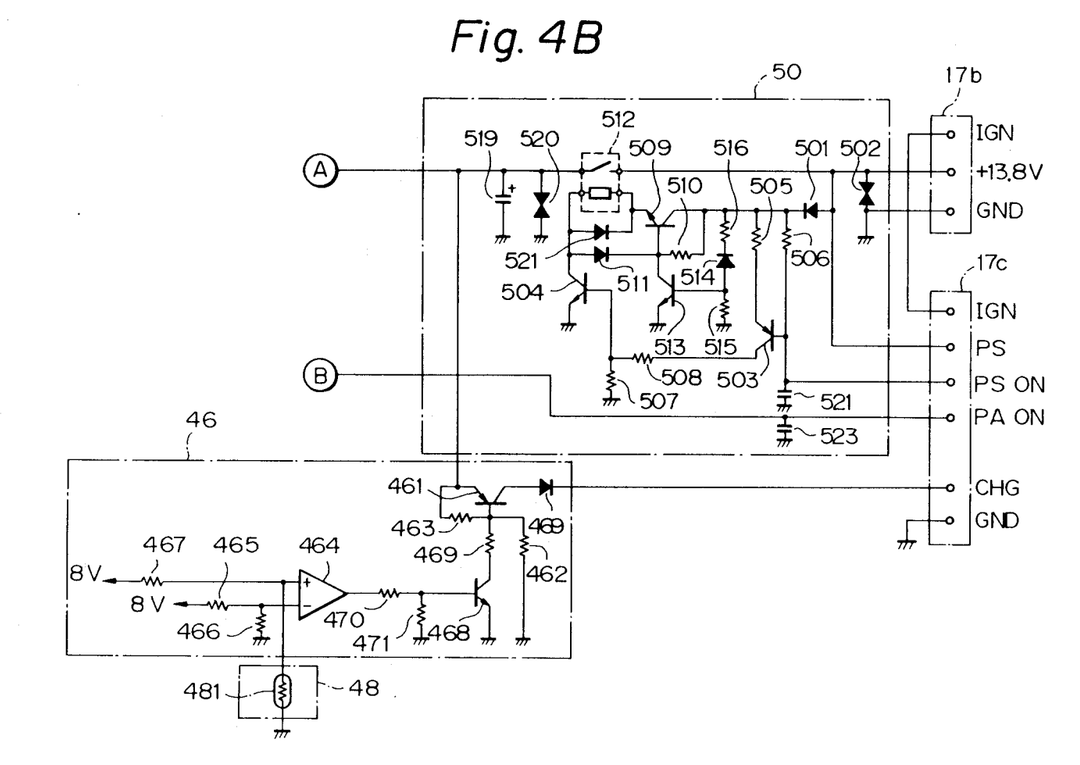

Referring to FIGS. 4A and 4B, a specific arrangement and operation of the structural elements of the booster and charging unit 14 in accordance with the present invention will be described.

First, the RF AMP 40 and the switches 34 and 36 will be described. A received wave coming in through the coaxial connector 17a for the car antenna 30 is distributed to the RF AMP 40 by a duplexer 361, which constitutes the switch 36. An amplifier 401 which constitutes the RF AMP 40 as previously stated is adapted to compensate for losses which are ascribable to a duplexer 341, the duplexer 361, and the coaxial cable interconnecting the unit 14 and telephone 20. The amplifier 401 is made up of an input matching capacitor 402, input matching strip lines 403 and 404, a transistor 405, an oscillation preventing resistor 406, output matching strip lines 407 and 408, and an output matching capacitor 409, whereby the amplifier 401 is operated on a high frequency basis. Further included in the amplifier 401 are a DC bias resistors 410 and 411. Capacitors 412 and 413 are adapted by-pass. A stabilizer 414 for 8 V is implemented with an integrated circuit. A capacitor 415 is also adapted for path control, or smoothing. A received wave applied to the amplifier 401 is amplified by approximately 10 dB and, then, delivered from the connector 22a via the duplexer 341.

As also shown in FIG. 4A, the booster 42 includes a power module 421. A transmit wave (+6 dB in this particular embodiment) coming in through the coaxial connector 22a is routed to the power module 421 via the duplexer 341. The transmit wave sufficiently amplified by the power module 421 is delivered to the duplexer 361 via a strip line 422 and isolator 423 and, then, fed out via the connector 17a. A strip line 424 is coupled with the strip line 422 to sense the level of the transmit wave, so that the energy of the transmit wave is partly rectified by a detector 425 to become a DC level. A resistor 426 is provided for making the level, which is mainly input to the detector 425, flat in a frequency band used. A capacitor 427 and a resistor 448 are used for smoothing purpose. An operational amplifier (OP AMP) 428 serves as an error amplifier for stabilizing the transmission output, the gain of the OP AMP 428 being controlled to an adequate value by resistors 429 and 430. A capacitor 431 is provided for eliminating oscillation. Resistors 432 and 433 are connected to the OP AMP 428 to apply a reference voltage to the latter. The transmission output is determined based on this reference voltage. A resistor 434 is adapted to protect a transistor 435. This transistor serves as a current buffer for the output of the OP AMP 428 and controls the transmission output of the power module 421. Further, capacitors 436, 437 and 438 function as path control capacitors.

The circuit which is constituted by the OP AMP 428 and its associated elements forms as ALC (Automatic Level Control) circuit which functions to maintain the transmission output constant. Specifically, when the transmission output is lowered, the output voltage of the detector 425 is lowered and, therefore, the OP AMP 428 raises its output in order to reduce the difference between the detector output voltage and the reference voltage. In this condition, the transistor 435 raises the voltage of the power module 421 and, thereby, the transmission output. Conversely, upon the rise of the transmission output, the output voltage of the detector 425 is raised resulting that the OP AMP 428 lowers the voltage of the power module 421 and, thereby, the transmission output through the transistor 435. The power module 421 has two ordinary power source terminals 439 and 440; one terminal 439 is adapted for output control, i.e., it lowers the output when the voltage is lowered and raises the output when the voltage is raised, and the other terminal 440 is constantly applied with a predetermined voltage. Capacitors 441, 442, 443 and 444 are associated with the power source terminals 439 and 440 of the power module 421 for path control. A transistor 445 serves to turn ON and OFF transmission output. While the transistor 445 is ON, the reference voltage of the ALC circuit remains substantially zero so that the transmission output is turned OFF; while the transistor 445 is OFF, the reference voltage of the ALC circuit remains in a steady state so that the transmission output is turned ON. Resistors 446 and 447 are provided for protecting the transistor 445.

Referring to FIG. 4B, the power source protecting circuit 50 is shown. When a voltage of +13.8 V is applied via the connector 17b, power is fed to the protecting circuit 50 via a diode 501 which is adapted for the protection against inverse power source connection. A varistor 502 serves to protect the protecting circuit 50 against instantaneous high-voltage surge. When a voltage is applied to an ignition terminal IGN of the connector 17b, i.e., when the ignition switch of the car is turned ON, information representative of such an occurrence is sent to the car adapter 12. When the adapter 12 delivers a command for supplying power to the booster and charger unit 14, a terminal PSON of the connector 17c is turned into (logical) low level, or "L". In this instance, power has been supplied from a terminal PS of the connector 17c to the unit 14. Upon the change of the terminal PSON connector 17c to "L", a transistor 503 and, then, a transistor 504 is rendered conductive. Resistors 505 and 506 are associated with the transistor 503 for protection purpose, and resistors 507 and 508 are associated with the transistor 504 for the same purpose. A transistor 509, a resistor 510 and a Zener diode 511 constitute in combination a stabilization power source the reference voltage of which is defined by the Zener diode 511. The stabilization power source functions to allow a relay 512 to remain energized until the voltage drops as low as possible, while preventing it from being damaged by high voltages. When power is applied to turn ON the transistor 504, the relay 512 is energized to feed power to the inside of the unit 14. A transistor 513 is adapted to protect the relay 512 against overvoltages, i.e., it turns ON in response to an overvoltage so that the base voltage of the transistor 509 is lowered to zero to deenergize the relay 512. A Zener diode 514 is energized when the power source voltage is raised beyond a Zener voltage, rendering the transistor 513 conductive. Resistors 515 and 516 are provided for protecting the Zener diode 514. Capacitors 521 and 523 are bypath capacitors. Further, a capacitor 519, a varistor 520, and a diode 521 are connected as shown.

Figure 5:
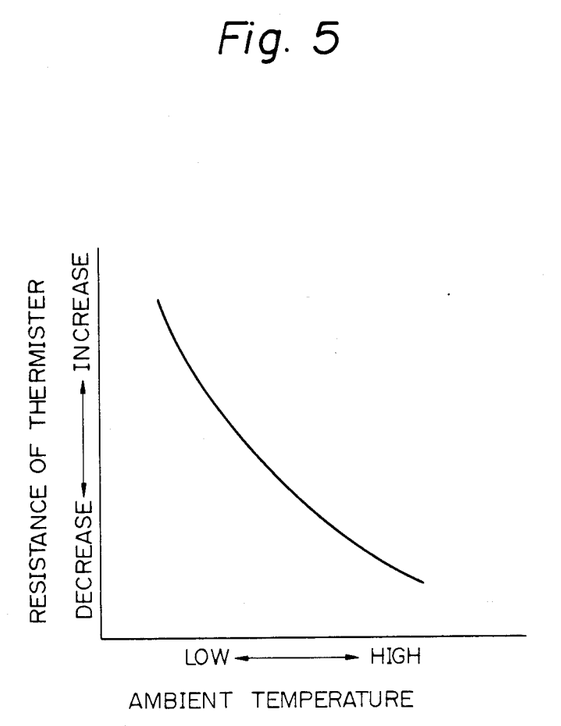
FIG. 5 is a graph showing a temperature characteristic of a thermistor which serves as a temperature sensor as shown in FIGS. 3, 4A and 4B.

The charging circuit 46 and the temperature sensor 48 are constructed as also shown in FIG. 4B. A transistor 461 constitutes a constant current circuit for charging and constantly feeds a current for trickle charge via a resistor 462. A resistor 463 is provided for eliminating malfunctions of the transistor 461. A comparator 464 serves to control rapid charge. Specifically, when a voltage generated by a resistor 467 and a thermistor 481, which constitutes the temperature sensor 48, is higher than a reference voltage as generated by 465 and 466, the comparator 464 produces (logical) high level, or "H", to thereby turn ON a transistor 468. Upon the turn-ON of the transistor 468, the transistor 461 begins to cause a large current for rapid charge to flow. This current for rapid charge is determined by adjusting a resistor 469. Conversely, when the actual voltage is lower than the reference voltage, the comparator 464 produces "L" to turn OFF the transistor 468 resulting that trickle charge occurs. As shown in FIG. 5, the temperature characteristic of the thermistor 481 is such that when the temperature is low, the resistance and, therefore, a voltage divided by the thermistor 481 and resistor 467 is high; as the temperature rises, the resistance of the thermistor 481 and, therefore, the divided voltage is lowered. Usually, such a threshold temperature is selected to be approximately 60° C. A diode 469 is adapted for the prevention of the reverse flow of a current. The output of the diode 469 is fed from a terminal CHG of the connector 17c, through the adapter 12, to a battery installed in the telephone 20 (FIG. 1). Inserted between the comparator 464 and the transistor 469 are resistors 470 and 471.

While the present invention has been shown and described in relation to a car-mount configuration, it will be apparent that it is similarly applicable to fixed radio equipment provided a suitable power source is available.

For compactness, the booster and charger unit 14 and the car adapter 12 may be combined into a single casing or housing.

In summary, it will be seen that a booster and charger unit in accordance with the present invention prevents a casing from being heated to excessive temperatures and, thereby, frees various structural elements installed therein from damage due to heat. In addition, since the casing is not expected to have a considerable radiating ability, the casing and, therefore, the whole casing can be miniaturized.

Various modifications will become possible for those skilled in the art after receiving the teachings of the present disclosure without departing from the scope thereof.

What is claimed is:

1. A booster and charger unit for a hand-held portable telephone comprising:
   an amplifying means for amplifying a transmitting signal;
   a charging means for charging a battery which is stored in the telephone;
   a casing for accommodating said amplifying means and charging means;
   a temperature sensor for sensing a change in temperature of the casing; and
   said charging means reducing its charging current to a predetermined value when a temperature of the casing sensed by said temperature sensor is elevated to a predetermined temperature.

2. A unit as claimed in claim 1, further comprising a power source and protecting means for feeding power to said amplifying means and charging means while protecting said amplifying means and charging means.

3. A unit as claimed in claim 1, further comprising a receiving means having an amplifier which compensates for deterioration of reception sensitivity.

4. A unit as claimed in claim 3, further comprising a switching means for selectively connecting said receiving means and amplifying means to an antenna mounted in a car.

5. A unit as claimed in claim 1, wherein said temperature sensor comprises a thermistor.

6. A unit as claimed in claim 3, further comprising a first duplexer connected at one distributing terminal to an input terminal of said amplifier of said receiving means and at another distributing terminal to an output terminal of said amplifying means, and a second duplexer connected at one distributing terminal to an output terminal of said amplifier of said receiving means and at another distributing terminal to an input terminal of said amplifying means.

7. A unit as claimed in claim 6 and a car adapter, said first duplexer further comprising an input/output terminal connected to an antenna mounted in a car and said second duplexer further comprises an input/output terminal connected through said car adapter to the hand-held portable telephone.

8. A unit as claimed in claim 2, wherein said power source and protecting means have an input terminal connected to a car battery.

9. A unit as claimed in claim 2, and a car adapter, said charging means having an output terminal connected to said car adapter which is connected to at least said telephone.

10. A unit as claimed in claim 7, wherein said car adapter has a terminal connected to at least said telephone.

11. A unit as claimed in claim 10, wherein said car adapter further has terminals connected to a handset, a handsfree microphone, and an external speaker, respectively.

* * * * *